INVENTOR.
WILLIS T. DOWNING
BY
B.L. Zangwill
ATTORNEYS.

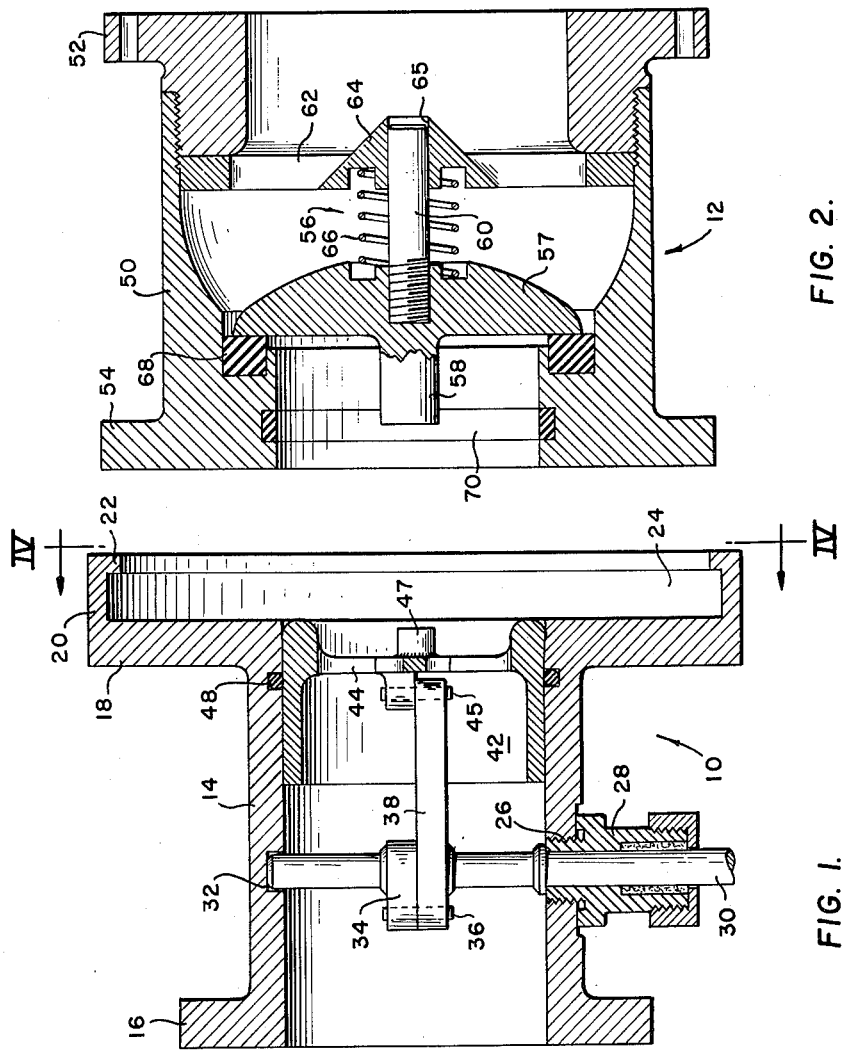

May 15, 1962 W. T. DOWNING 3,034,807
QUICK DISCONNECT SIDE SLIDE COUPLING
Filed Dec. 29, 1958 3 Sheets-Sheet 3

INVENTOR.
WILLIS T. DOWNING
BY
B. L. Zangwill
ATTORNEYS.

United States Patent Office

3,034,807
Patented May 15, 1962

3,034,807
QUICK DISCONNECT SIDE SLIDE COUPLING
Willis T. Downing, 20 N. Saturn Ave., Clearwater, Fla.
Filed Dec. 29, 1958, Ser. No. 783,622
1 Claim. (Cl. 285—33)
(Granted under Title 35, U.S. Code (1952), sec. 266)

The invention described herein may be manufactured and used by or for the Government of the United States of America for governmental purposes without the payment of any royalties thereon or therefor.

This invention relates to a quick disconnect coupling, and more particularly to a quick disconnect coupling adapted for use in connecting together fluid conduits.

It is pointed out that there have been numerous attempts in the past to provide a quick-disconnect coupling for connecting together fluid conduits, such prior art devices having, for example, made frequent use of bayonet-type connections. In addition use has been made of a plurality of spring biased balls held under a slip collar or in a groove in a tapered member, as for example the structure shown in the patents Serial Nos. 2,771,308 and 2,795,438. The aforementioned prior art devices have certain material disadvantages. For example, the ball and groove connection is subject to wear and thus is very likely to become loose after protracted use, thus impairing the tightness of the connection and giving rise to fluid leakage and the like; the ball and groove arrangement referred to has the further disadvantage of providing a rather loose connection even when new, unless extremely strong springs are used in biasing the ball elements into the cooperating coupling member. The bayonet type connection usually provides a protruding member having a pair of detents thereon, which member by virtue of the protruding elements thereon, is subject to damage or is even likely to cause injury to persons using the same. In addition it is pointed out that centering of the bayonet members of the coupling, one within the other, without interference is rather difficult, since the appropriate detents and grooves must be aligned and then the members must be rotated relative to one another.

The instant invention comprises means for connecting together two coupling sections and includes a means for locking together the sections, sealing the connection therebetween and opening a valve contained within one of said sections, all in one operation. The fuel receiving coupling section is equipped with a flange retaining U-shaped track that is formed at one end of one of the coupling sections. The same coupling section is equipped with a slidable sleeve-like member having substantially open end portions. An externally rotatable means is provided for moving the sleeve lengthwise of the coupling element in which it is carried. The second coupling section, which may be referred to as the fluid supplying section, is fastened to a supply conduit and is equipped with an internal, spring-loaded valve member that is so arranged that it seals under the influence of the spring member associated therewith and also under the influence of the pressure within the hose. The section is also provided with an external flange adapted to ride in the aforementioned U-shaped track. After the two sections are brought together by the U-shaped track on the first section, movement of the sleeve in the first section pushes the spring actuated valve to an open position, whereby fluid may flow from the supply hose through the sleeve member and into the fluid receiving assembly. The elements are so proportioned that when the sleeve member is actuated it slides across the line of joinder between the two sections thereby preventing withdrawal of the fluid supply section from the U-shaped guide track, thus preventing disassembly of the apparatus while fluid is flowing therethrough. To disassemble the coupling sections the sleeve actuating means is rotated so as to allow the sleeve to be withdrawn into its coupling section and inwardly of the outermost edge of said section, whereby the fluid supply member may be withdrawn from the U-shaped track.

It is an object of this invention to provide a quick-disconnect coupling that will overcome the disadvantages of the prior art.

Another object of this invention is to provide a quick-disconnect coupling having coupling-locking means and fluid flow control means therein.

A further object of this invention is to provide a quick-disconnect coupling having coupling locking means and fluid control valve means wherein actuation of the coupling locking means actuates said fluid control valve.

Still a further object of this invention is to provide a quick-disconnect coupling comprising a pair of interlocking flanges one of said flanges having a U-shaped track member said track member having a portion thereof pivotly connected to its flange.

Still another object of this invention is to provide a quick-disconnect coupling having a fluid supplying coupling section having incorporated therein a fluid control valve adapted to automatically close upon disassembly of the coupling.

Other objects and many of the attendant advantages of this invention will be readily appreciated as the same becomes better understood by reference to the following detailed description when considered in connection with the accompanying drawings, wherein:

FIG. 1 is a plan view, in section, of the fluid receiving section of the quick-disconnect coupling produced in accordance with the instant invention;

FIG. 2 is a plan view, in section, of a fluid supplying section adapted for use with the coupling section shown in FIG. 1;

Figure 3:
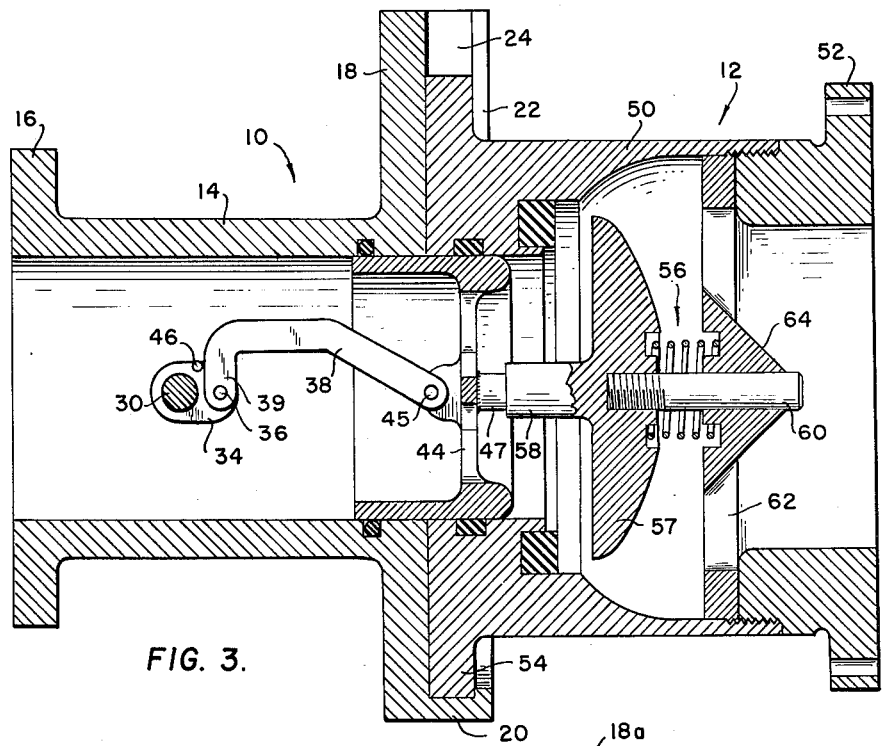
FIG. 3 is an elevational view, in section, of the instant fluid receiving and supplying coupling sections respectively, in assembled condition, with the valve in the fluid supplying section in open position.

Referring now to the drawings wherein like reference characters designate like or corresponding parts throughout the several views, there is shown in FIG. 1 a fluid receiving coupling section 10, and in FIG. 2 a fluid supplying coupling section 12. The coupling sections 10 and 12 are adapted respectively to be attached to fluid receiving and fluid supplying conduits of one sort or another.

The coupling section 10 comprises a cylindrical portion 14 having a connecting flange 16 at one end thereof for connecting the member 10 to a fluid receiving conduit. At the opposite end of the cylindrical portion 14 there is an outwardly extending, enlarged flange 18 having a forwardly extending U-shaped shoulder portion 20. The forwardmost edge of the shoulder 20 is provided with a U-shaped inwardly turned lip 22, whereby is formed a flange receiving, U-shaped slot 24 between the lip 22 and the flange 18.

The cylindrical portion 14 of the coupling section 10 is provided with a threaded opening 26 extending through its wall. The opening 26 receives a threaded thimble 28 that acts as a packing gland and bearing for a rotatable shaft 30 that extends through the gland 28 and into the cylindrical portion 14. The innermost end of the shaft 30 is rotatably carried within a recess 32 formed in the inner wall of the cylindrical portion 14, whereby the shaft 30 is supported at its opposite ends by the packing gland 28 and within the recess 32.

A crank arm 34 is fixedly connected to the shaft 30 and has pivotly connected to its free end, by a pin 36, a pitman 38 that extends toward the righthand end of the coupling section 10, viewed in FIG. 1. It is pointed out, that the pitman 38 is provided with a right angle bend 39 adjacent its rearmost end, that is, the end connected to the crank-arm 34, said crank-arm 34 being provided with a stop pin 41 adapted to abut the bend 39.

The right-hand end of the pitman 38 is pivotly connected to a cylindrical sleeve member 42 slidably mounted within the cylindrical portion 14. The sleeve 42 is cylindrical in shape and open at both ends being provided, adjacent its right-hand end, with a spider-like arrangement 44 composed of a plurality of cross-arms, as can be seen more clearly in FIG. 4. The right hand end of the pitman 38 is connected to the center of the cross-arms or spider 44 by a pin 45. The spider 44 is in turn provided with a centrally located stud 47 for purposes hereinafter described.

The inner wall of the cylinder 14 is provided with an annular recess in which is located a seal or O-ring 48 adapted to insure a fluid type seal between the outer surface of the sleeve 42 and the inner surface of the cylinder 14 so as to prevent passage of fluid around the outside surface of the sleeve 42.

The second coupling section 12 consists of a substantially cylindrical member 50 having a connecting flange 52 at its right hand end, as viewed in FIG. 2, so that the section 12 may be connected to a fluid supplying conduit. The coupling section 12 further comprises an outwardly extending coupling flange 54 at its left hand end adapted to cooperate with the U-shaped slot 24 at the right hand end of coupling section 10, in the manner shown in FIG. 3. A poppet valve member 56 is slidably mounted within the coupling member 12 and consists essentially of a round disc 57 having a stud 58 attached to, its left hand face, and extending toward the stud 47 on the sleeve 42 said studs 47 and 58 being adapted to abut one another when the coupling sections 10 and 12 are in assembled condition, as shown in FIG. 3. The valve disc 57 is provided with a rod 60 fixedly mounted in its right hand face, said rod 60 may be either integrally formed with the disc 57, or as shown in FIG. 2, threadedly mounted therein. A spider 62 is removably mounted wtihin the coupling section 12, and in accordance with the preferred embodiment shown in FIG. 2, said spider 62 is provided with screw threads at its periphery that cooperate with like screw threads formed on the interior of the coupling section 12. The spider 62 is provided with a stud-like member 64 at its center, said stud-like member 64 being provided with a hole 65 extending axially thereof, said hole 65 being adapted to slidably receive the rod 60 on the valve 57. The valve assembly 56 further includes a coil spring 66 that surrounds the rod 60; the opposite ends of the spring 66 are in abutting relation with the right hand face of the valve 57, and the left hand face of the stud 64 so that the valve 57 is forced towards the discharge end of the coupling section 12.

The left hand face of the valve 57 is seated against a resilient, fluid sealing ring 68 carried in an annular recess formed on the interior of the coupling section 12, so that when the valve 57 is in the position shown in FIG. 2, fluid cannot escape around said valve. The interior of the coupling section 12 is provided with another gasket or sealing ring 70 adjacent the discharge end thereof, said ring 70 being carried in an annular recess formed within the section 12; the ring 70 is for sealing purposes hereinafter described in greater detail.

Referring now to FIG. 3. When the coupling sections 10 and 12 are to be assembled, the flange 54 is dropped into the U-shaped slot 24. The shaft 30 is then rotated in a clockwise direction until the stop pin 46 contacts the rearmost edge of the right angle portion 39 of the pitman 38, thereby preventing further rotation of the shaft 30. The various elements are so proportioned that when rotation of shaft 30 is halted by pin 46, in the manner shown in FIG. 3, the sleeve 42 has moved to a forward position, and the right hand portion thereof is within coupling section 12, thereby bridging said coupling sections and preventing withdrawal of coupling section 12 from the slot 24, thus locking the coupling elements in assembled condition. At the same time leakage around the outer surface of the sleeve 42 is prevented by the sealing contact of the O-ring 48 and the gasket 70 with the outer surface of said sleeve.

When the sleeve 42 is being moved to its forwardmost position, the stud 47 on said sleeve abuts the stud 58 on the valve 57 and thus moves said valve to the open position shown in FIG. 3. The valve 57 remains in open position until the shaft 30 is rotated in a counterclockwise direction to the position shown in FIG. 1, thereby making it possible for the valve 57 to close and the coupling sections to be disassembled.

Figure 4:
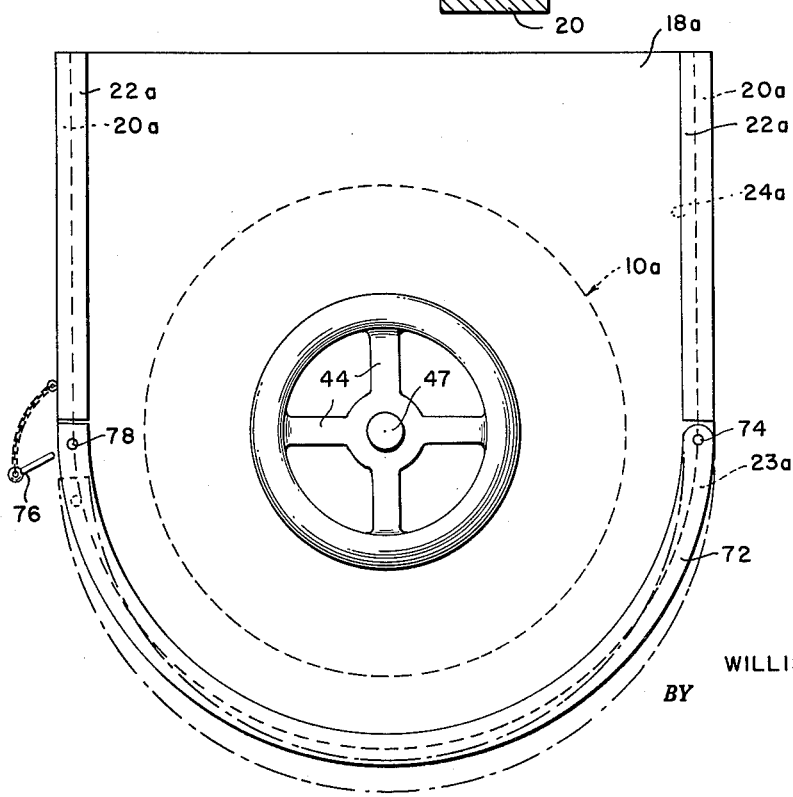
FIG. 4 is an elevational view taken on line IV—IV of FIG. 1, showing a modified embodiment of the instant invention.

Attention is directed to FIG. 4 wherein is shown a modified embodiment of the coupling section 10, said modified embodiment being designated 10a. The section 10a has a U-shaped flange 18a at one end, which flange corresponds to flange 18 on coupling section 10. The flange 18a is provided with a pair of forwardly extending shoulders 20a at its opposite sides. Each shoulder 20a is in turn provided with an inwardly directed lip 22a, the shoulders 20a and the lips 22a serving to form a track at the respective sides of the flange 18a. A third track section 72 that is arcuate in shape serves to join the lower ends of the side tracks on flange 18a. The track section 72 has elements that form extensions respectively of the shoulders 20a and the lips 22a, and thus a U-shaped, two-piece track 24a is provided on flange 18a.

The U-shaped member 72 has one end pivotly connected to the flange 18a by a pin 74 and the opposite end thereof removably connected to said flange 18a by means of a removable pin 76 removably mounted within aligned holes in the end of the U-shaped member 72 and the flange 18a. Thus in this embodiment, when it is desired to disassemble the coupling sections 10a and 12, it is not necessary to raise the coupling section 12 from the slot 24, but rather it is merely necessary to remove the pin 76 allowing the U-shaped member 72 to drop downwardly under the influence of the weight of the coupling section 12, with the ensuing result that the coupling section 12 will drop free of the coupling section 10a. It is emphasized that the embodiment shown in FIG. 4 provides a quick-release means for the coupling assembly and does not require that a heavy coupling section, such as section 12, be lifted from the slot 24 in order to disassemble the device.

Figure 5:
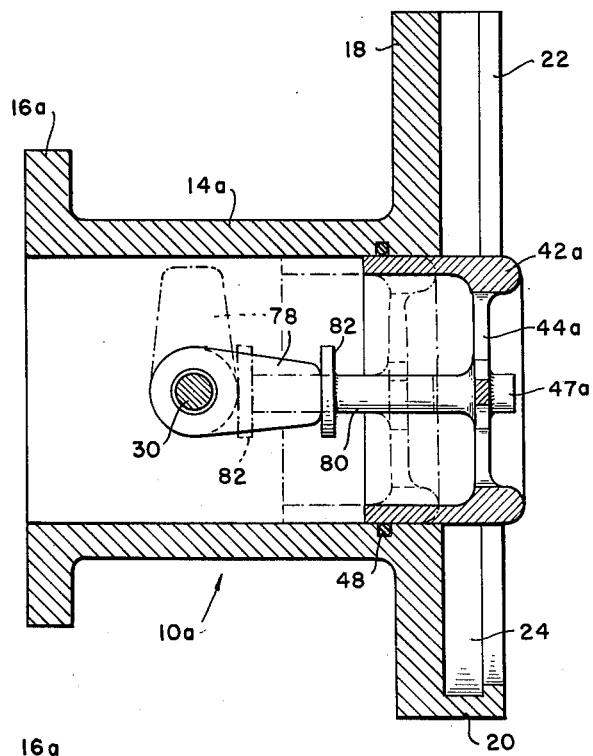
FIG. 5 is an elevational view, in section, of a modified embodiment of the instant invention.
Figure 6:
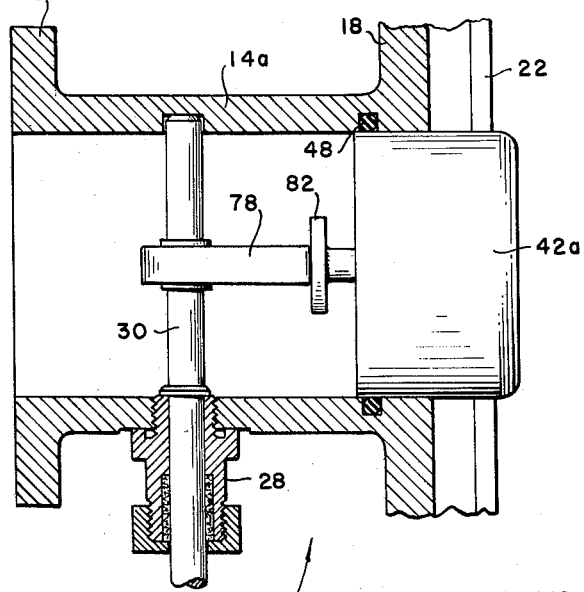
FIG. 6 is a plan view, in section, of the structure shown in FIG. 5.

Referring now to FIGS. 5 and 6 wherein is shown a further embodiment of the coupling section 10. In the instant embodiment, the shaft 30 has a cam member 78 fixedly mounted thereon, said cam member having a flat surface at its free end. A sleeve 42a is slidably mounted within the cylindrical portion 14 in intimate contact with the walls of said cylinder, and an O-ring 48 is mounted within an annular recess in the inner surface of the cylinder 14 for the same purposes as the ring 48 shown in FIG. 1. The sleeve 42a is open at both ends and at its right hand end is provided with a spider member 44a fixedly mounted in said open end. The spider 44a is provided with a rearwardly extending follower rod 80 fixedly connected to said spider, and having at its rearmost end a cam follower disc 82 adapted to be abutted by the cam 78 in the manner shown in both solid and dotted lines in FIG. 5. Thus when the shaft 30 is rotated in a clockwise direction, as viewed in FIG. 5, the cam 78 is brought to bear against the cam follower disc 82 forcing the sleeve 42a towards the right and against the stud 58 on the valve 57, which in this embodiment is identical with the stud shown in the coupling section 12, said coupling section 12 being identical in both embodiments. When shaft 30 is rotated in a clockwise direction the sleeve 42a is cammed toward the right and a stud 45a mounted on the right hand face of the spider 44a bears against the stud 58 on the valve 57 forcing the latter towards the right in much the same manner as shown in FIG. 3, with the result that the sleeve 42a locks the coupling sections in assembled condition, and at the same time opens the valve 57. When shaft 30a is subsequently rotated in a counterclockwise direction spring 66 forces the valve 57 to the left along with the stud 58, which in turn while bearing on the stud 45a forces the sleeve 42a to the left thereby causing the coupling sections to be free for disassembly. In other words, it is the action of spring 66 which causes the sleeve 42a to move inwardly of the cylindrical member 14 instead of there being any positive connection between the cam 78 and the follower plate 82.

It is emphasized that the coupling section 10, shown in FIG. 5 may be provided with a flange assembly such as that shown in FIG. 4, as an alternative to that already shown in FIG. 5.

It is accordingly respectfully submitted that the structure set forth above provides a pair of coupling sections for use in a fluid supply line, which sections are adapted to be readily assembled and disassembled with a minimum amount of effort and danger. Furthermore the instant coupling possesses the property of being capable of being simultaneously locked in coupled condition, and opening a valve assembly contained within one of the coupling members. The instant invention also provides a modified embodiment, as shown in FIG. 4, whereby the coupling sections may be disassembled without requiring that one of the coupling sections be lifted free of the other; in accordance with the embodiment shown in FIG. 4 one of the coupling sections may be allowed to drop free of the other coupling member, thereby expediting disassembly of the elements particularly where said elements are quite large and/or heavy.

It should be understood, of course, that the foregoing disclosure relates to only preferred embodiment of the invention and that numerous modifications or alterations may be made therein without departing from the spirit and scope of the invention as set forth in the appended claim.

What is claimed is:

A conduit coupling assembly comprising disconnectable coupling sections, a first of said coupling sections comprising a tubular portion, a sleeve member slidably mounted within said tubular portion and having an outer surface in surface contact with the inner surface of said tubular portion, said tubular portion having an outwardly extending flange at one end thereof, a U-shaped track extending around a portion of the periphery of said flange, said track being open at the open end of the U and thereby adapted to receive a flange; a second coupling section comprising a substantially tubular portion having a passageway therethrough and having an outwardly extending flange at one end thereof removably fitted into said U-shaped track, the portion of the passageway within said second coupling section that is immediately adjacent said flange being the same size and shape as the outer surface of said sleeve and adapted to receive a portion of said sleeve in intimate surface contact with the outer surface of said sleeve, said U-shaped track comprising a U-shaped shoulder on the flange on said first coupling section and extending forwardly of said flange, an inwardly turned lip on said shoulder and extending at right angles to said shoulder and substantially parallel to said flange; and the bight portion of the U-shaped shoulder and the lip attached thereto being at least partially removable from the flange on the first coupling section, whereby the flange on said second coupling section may be dropped out of said U-shaped track upon removal of the bight portion of said track, actuating means for moving said sleeve to a position such that it is partially within each coupling section thereby locking said coupling sections against separation from one another, said actuating means including a crank and pitman assembly within said coupling and drivably connected to said sleeve, a drive shaft passing through a hole in the coupling assembly, said crank and pitman assembly being operable from the exterior of said coupling by means of said drive shaft, a moisture tight sealing means, said moisture tight sealing means being placed around said shaft to seal the hole in said coupling, and moisture sealing means interposed between the outer surface of said sleeve and the inner, sleeve contacted surface of each coupling section so that no moisture may escape from the assembly when the sleeve is located partially within each coupling section.

References Cited in the file of this patent

UNITED STATES PATENTS

| | | |
|---|---|---|
| 545,066 | Fregeau | Aug. 27, 1895 |
| 779,479 | Howell | Jan. 10, 1905 |
| 1,339,141 | Sharpnack | May 4, 1920 |
| 1,592,093 | Foucault | July 13, 1926 |
| 1,720,072 | Cox | July 9, 1929 |
| 1,756,094 | McGuirk | Apr. 29, 1930 |
| 2,288,565 | Green | June 30, 1942 |
| 2,680,030 | Hoelzer | June 1, 1954 |
| 2,686,529 | Lanninger | Aug. 17, 1954 |
| 2,842,337 | Pintarelli | July 8, 1958 |

FOREIGN PATENTS

| | | |
|---|---|---|
| 512,130 | Great Britain | Aug. 29, 1939 |